United States Patent [19]

Morita

[11] Patent Number: 4,798,059
[45] Date of Patent: Jan. 17, 1989

[54] AIR CONDITIONER WITH HEAT REGENERATION CYCLE

[75] Inventor: Keiichi Morita, Fujinomiya, Japan

[73] Assignee: Kabushiki Kaisha Toshiba, Kawasaki, Japan

[21] Appl. No.: 92,540

[22] Filed: Sep. 3, 1987

[30] Foreign Application Priority Data

Jan. 30, 1987 [JP] Japan .................................. 62-18643

[51] Int. Cl.$^4$ .............................................. F25B 27/00
[52] U.S. Cl. ................................. 62/228.4; 62/197; 62/278; 62/238.7; 165/902
[58] Field of Search ................ 62/238.6, 238.7, 228.4, 62/228.5, 513, 113, 324.6, 201, 437, 160, 278, 197; 165/902, 104.21; 237/2 B

[56] References Cited

U.S. PATENT DOCUMENTS

| | | | |
|---|---|---|---|
| 2,687,021 | 8/1954 | Mattison | 62/278 |
| 3,477,240 | 11/1969 | Thoren et al. | 62/197 X |
| 3,838,582 | 10/1974 | Redfern et al. | 62/278 X |
| 4,083,195 | 4/1978 | Kramer et al. | 62/278 X |
| 4,598,557 | 7/1986 | Robinson et al. | 62/238.7 |
| 4,622,827 | 11/1986 | Jabami et al. | 62/228.4 X |

FOREIGN PATENT DOCUMENTS 60-182657  5/1984  Japan .

Primary Examiner—Harry B. Tanner
Attorney, Agent, or Firm—Cushman, Darby & Cushman

[57] ABSTRACT

A refrigeration cycle of an air conditioner includes a variable-capacity compressor which has a predetermined maximum capacity. A thermal storage tank filled with a regenerative material is connected between the discharge side of the compressor and an indoor heat exchanger. In a regenerating operation of the refrigeration cycle, the regenerative material deprives the heat of a refrigerant discharged from the compressor and stores it. At this time, the compressor is driven within a capacity range having a maximum value lower than the predetermined maximum capacity, and an indoor fan for delivering air to the indoor heat exchanger is stopped.

9 Claims, 2 Drawing Sheets

| OPERATION MODE | FIRST VALVE 6 | SECOND VALVE 16 | THIRD VALVE 18 | FOURTH VALVE 20 | INDOOR-SIDE FAN 13 |
|---|---|---|---|---|---|
| ORDINARY HEATING | OPEN | CLOSE | OPEN OR CLOSE | CLOSE | ON |
| HEATING/ REGENERATION | " | " | " | " | " |
| REGENERATION | " | " | " | " | OFF |

AIR CONDITIONER WITH HEAT REGENERATION CYCLE

BACKGROUND OF THE INVENTION

The present invention relates to an air conditioner, and more particularly, to an air conditioner with a refrigeration cycle including a thermal storage tank.

Recently, air conditioners have been developed which have a refrigeration cycle including a thermal storage tank. In one such conventional air conditioner, the thermal storage tank is connected to the discharge side of a variable-capacity compressor, which is driven by means of an inverter unit. A regenerative material is sealed in the storage tank. It serves to exchange heat with a refrigerant discharged from the compressor. The storage tank is connected in succession with an indoor heat exchanger, an expansion device, an outdoor heat exchanger, and the compressor, all these members constituting the refrigeration cycle. The regenerative material in the thermal storage tank is heated and stored with heat by the refrigerant discharged from the compressor. The compressor is driven with fans of the indoor and outdoor heat exchangers off and on, respectively. Thereupon, the high-temperature, high-pressure refrigerant condenses in the storage tank, and its condensation heat is stored in the regenerative material.

The heat stored in the thermal storage tank is utilized as a heat source for heating the refrigerant, at the start of the heating operation of the refrigeration cycle or during the defrosting operation thereof.

Conventionally, in the regenerating operation described above, the compressor is driven within the same output frequency range as in an ordinary heating operation. In this case, however, the condensation pressure of the refrigerant increases drastically in the thermal storage tank, thereby entailing various problems. More specifically, paraffin or other material is used usually as the regenerative material which utilizes latent heat. At the start of the regenerating operation of the refrigerating cycle, the regenerative material is in a solid phase, so that its heat transfer rate is low, and its effectiveness is lower than that of the indoor heat exchanger or the like. Accordingly, the high-temperature, high-pressure refrigerant discharged from the compressor is kept at high pressure without being fully condensed in the storage tank. The inverter unit cannot rapidly control the output frequency of the compressor in accordance with the high-pressure state of the refrigerant. Thus, the compressor may possibly be damaged by an excessive increase of pressure, or stopped by an actuation of a condensation-temperature sensor which is provided beside the indoor heat exchanger.

Usually, moreover, the compressor requires a protection time of several minutes before restarting. In the regenerating operation, therefore, the compressor cannot operate satisfactorily, thus lowering its operating efficiency considerably.

SUMMARY OF THE INVENTION

The present invention has been contrived in consideration of these circumstances, and is intended to provide an air conditioner capable of efficiently performing regenerating operation without damaging or stopping a compressor.

In order to achieve the above object, an air conditioner according to the present invention comprises a refrigeration cycle including a variable-capacity compressor having a predetermined maximum capacity, an indoor heat exchanger, an expansion device, an outdoor heat exchanger, refrigerant circulation means connecting all these components, thereby forming a closed circuit through which a refrigerant flows, an indoor fan for introducing air into the indoor heat exchanger, an outdoor fan for delivering air to the outdoor heat exchanger, and regeneration means connected to the circulation means, at a point between the discharge side of the compressor and the expansion device, for storing residual heat of the refrigerant, whereby an ordinary heating operation and regenerating operation for storing the regeneration means with heat of the refrigerant discharged from the compressor are effected; and drive means for, in the regenerating operation, stopping the indoor fan and driving the compressor within a capacity range having a maximum value lower than the predetermined maximum capacity.

BRIEF DESCRIPTION OF THE DRAWINGS

FIGS. 1 to 4 show an air conditioner according to an embodiment of the present invention, in which:

FIG. 1 is a plan view showing a refrigeration cycle of the air conditioner;

FIG. 2 shows operating states of valves and a fan for different operation modes of the air conditioner;

FIG. 3 is a diagram showing ranges of the operating frequency of a compressor for a heating mode and a regeneration mode; and FIG. 4 shows the relation between the regeneration temperature and the operating frequency of the compressor.

DETAILED DESCRIPTION OF THE PREFERRED EMBODIMENT

An embodiment of the present invention will now be described in detail with reference to the accompanying drawings.

Figures 1, 2:
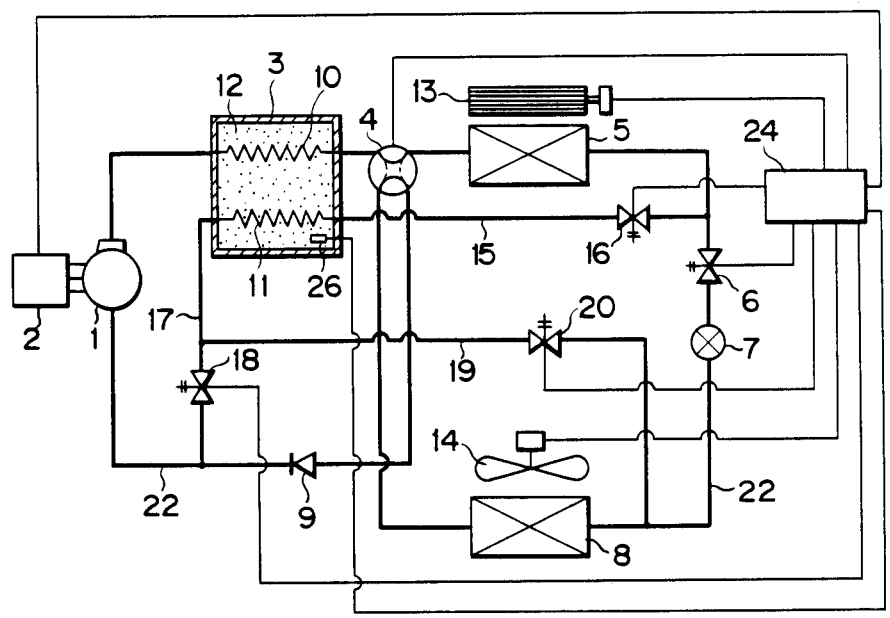

FIG. 1 shows a refrigeration cycle of an air conditioner according to the present invention. The refrigeration cycle includes variable-capacity compressor 1 which is driven by inverter unit 2. Thermal storage tank 3 is connected to the discharge side of the compressor. More specifically, the discharge side of compressor 1 is connected to its suction side successively through heat exchanger 10 for heating, which is disposed in tank 3, one port of four-way valve 4, indoor heat exchanger 5, first solenoid valve 6, expansion valve 7 for use as an expansion device, outdoor heat exchanger 8, the other port of valve 4, and check valve 9. All these members are connected by means of refrigerant pipe 22.

Endothermic heat exchanger 11 and a regenerative material, such as paraffin 12, are disposed in thermal storage tank 3. A refrigerant condensed by heat exchanger 5 flows through exchanger 11. The regenerative material has a melting point ranging from about 40° to 50° C. Indoor fan 13 of a cross-flow type is disposed facing indoor heat exchanger 5, while outdoor fan 14 of a propeller type is disposed facing outdoor heat exchanger 8.

One end of regeneration line 15 is connected to refrigerant pipe 22, at a point between heat exchanger 5 and solenoid valve 6. The other end of line 15 is connected to one end of heat exchanger 11. The other end of exchanger 11 is connected to pipe 22, at a point between compressor 1 and check valve 9, by means of return line 17. Lines 15 and 17 are provided with second and third solenoid valves 16 and 18, respectively.

The refrigerating cycle further includes defrosting line 19 through which the refrigerant flowing through line 17 is fed to outdoor heat exchanger 8. One end of line 19 is connected to line 17 at a point between heat exchanger 11 and solenoid valve 18. The other end of line 19 is connected to refrigerant pipe 22 at a point between expansion valve 7 and heat exchanger 8. Also, line 19 is provided with fourth solenoid valve 20.

Figure 3:
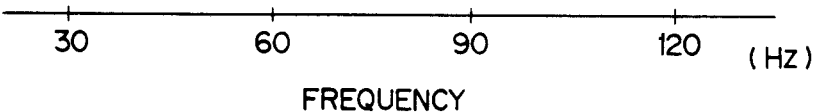

Inverter unit 2 delivers a three-phase alternating current to compressor 1, within an output frequency range of, e.g., 30 to 120 Hz, in accordance with an air-conditioning load, for example, the difference between a set temperature and room temperature. Thus, the compressor is controlled for proper compression capacity corresponding to the air-conditioning load. As is shown in FIG. 3, the operating frequency of compressor 1 is controlled within the range of 30 to 120 Hz for a heating mode or a heating/regeneration mode (mentioned later) of the refrigerating cycle. In a regeneration mode, as mentioned later, compressor 1 is driven within an operating frequency range of, e.g., 30 to 90 Hz, such that its maximum capacity is lower than in the case of the heating or heating/regeneration mode. Thus, the maximum capacity of compressor 1 in the regeneration mode is about 25% lower than that in the heating or heating/regeneration mode.

Inverter unit 2, first to fourth solenoid valves 6, 16, 18 and 20, four-way valve 4, and fans 13 and 14 are connected to driver circuit 24, to be controlled thereby.

The operation of the air conditioner with the aforementioned construction will now be described. In the heating, heating/regeneration, and regeneration mode, first to fourth solenoid valves 6, 16, 18 and 20, and fans 13 are operated as shown in FIG. 2 by driver circuit 24.

In the heating mode, four-way valve 4 is shifted by driver circuit 24 to a heating position, as indicated by full line in FIG. 1. Thereupon, the high-temperature, high-pressure refrigerant discharged from compressor 1 is fed through thermal storage tank 3 and valve 4 to indoor heat exchanger 5, where it is condensed by heat exchange with room air delivered by fan 13. Since regenerative material 12 in tank 3 is already stored fully with heat before the heating operation, the hightemperature, high-pressure refrigerant from compressor 1 is fed directly to heat exchanger 5, without being condensed in heat exchanger 11 inside tank 3. Then, the refrigerant, condensed in heat exchanger 5, is introduced into expansion valve 7 via solenoid valve 6, decompressed in valve 7, and then flows into outdoor heat exchanger 8. Thereupon, the refrigerant is evaporated by heat exchange with the outside air introduced by fan 14. Thereafter, the evaporated refrigerant is returned to the suction side of compressor 1 through four-way valve 4 and check valve 9.

If regenerative material 12 is not stored fully with heat, the heating/regeneration operation is performed. In the heating/regeneration mode, although the refrigerant flows in the same manner as in the heating mode, material 12 is not stored fully with heat. Therefore, part of the high-temperature, high-pressure refrigerant discharged from compressor 1 serves to heat the regenerative material and condense, through heat exchange therewith, as it passes through heat exchanger 10. Thereafter, the refrigerant flows through indoor heat exchanger 5 to be condensed wholly.

In the ordinary heating mode or heating/regeneration mode, compressor 1 is driven within the output frequency range of 30 to 120 Hz by inverter unit 2. If the airconditioning load is large, or if the room temperature is lower than the set temperature, compressor 1 is driven at the maximum output frequency of 120 Hz. As the airconditioning load becomes smaller, thereafter, the compressor output is lowered gradually to 30 Hz.

If the temperature of regenerative material 12 is lowered after the operation of the air conditioner is stopped, a regenerating operation is performed. In the regeneration mode, solenoid valves 6, 16, 18 and 20 are operated in the same manner as in the heating mode, indoor fan 13 is stopped, and only outdoor fan 14 is driven.

Thereupon, the refrigerant from compressor 1 is deprived of heat to be condensed by regenerative material 12 when it flows through heat exchanger 10 in thermal storage tank 3. The condensed refrigerant flows through indoor heat exchanger 5 as it is, and is then fed through solenoid valve 6 and expansion valve 7 to outdoor heat exchanger 8, where it is evaporated. Thereafter, the refrigerant is returned to the suction side of compressor 1 via four-way valve 4 and check valve 9. As the aforesaid cycle is repeated, regenerative material 12 is heated and stored with heat through heat exchange with the high-temperature, high-pressure refrigerant.

At the start of the regenerating operation, regenerative material 12 is in the solid phase, and its heat transfer rate is low. Since the difference between the temperature of material 12, at the start of regeneration, and regeneration temperature (50° C.) is great, compressor 1 is driven at the maximum output frequency by inverter unit 2. In doing this, the operating frequency range of unit 2, for the regeneration mode, is set to 30 to 90 Hz, that is, the maximum frequency is 90 Hz, as is shown in FIG. 3. Therefore, the amount of heat radiation at heat exchanger 10 in thermal storage tank 3 is an optimum amount for heating regenerative material 12 in the solid phase. In contrast with the conventional arrangement in which compressor 1 is operated at the maximum frequency of 120 Hz, the condensation pressure and temperature of the refrigerant can never increase drastically, so that damage to and stoppage of the compressor can be prevented.

Figure 4:
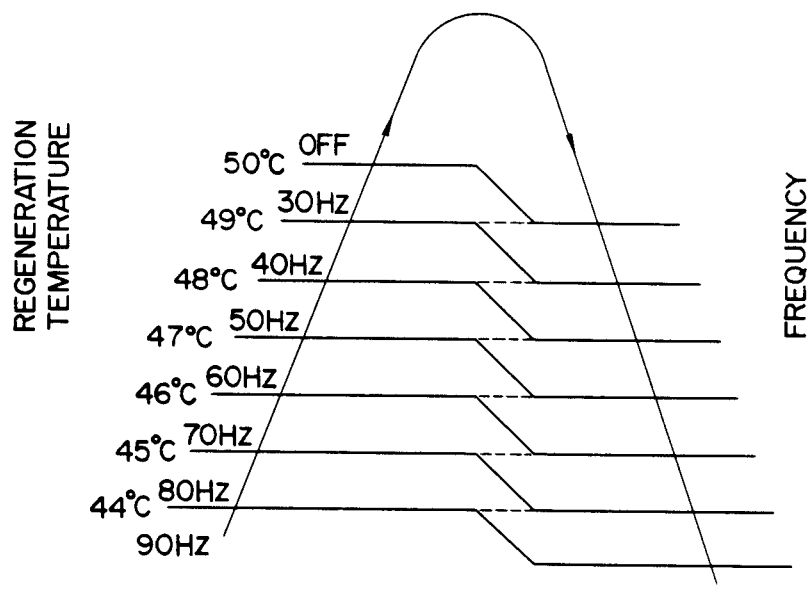

In the regeneration mode, the output frequency of inverter unit 2 is lowered in response to the rise in temperature of regenerative material 12, as is shown in FIG. 4. When the temperature of material 12 reaches a preset regeneration temperature, compressor 1 is stopped. If the temperature of material 12 is lowered by radiation of heat or the like, thereafter, compressor 1 is driven so as to maintain the preset regeneration temperature. The temperature of regenerative material 12 is detected by temperature sensor 26 in thermal storage tank 3.

Normally, at the start of the heating operation, the components of the refrigerating cycle, such as the compressor, indoor heat exchanger, etc., are so cold that the temperature rise of the refrigerant requires much time. Thus, a long time must elapse from the start of the heating operation until warm air starts to come out of the indoor heat exchanger. In the refrigeration cycle of this embodiment, therefore, a rise-time operation for heating is performed at the start of the heating operation. During the rise-time operation, first and fourth solenoid valves 6 and 20 are closed, and second and third solenoid valves 16 and 18 are opened. As a result, the refrigerant discharged from compressor 1 passes through heat exchanger 10 in thermal storage tank 3 and indoor heat exchanger 5 to be condensed therein. Thereafter, it is expanded in valve 16 and then flows through regeneration line 15 into heat exchanger 11 in tank 3. At this time, the refrigerant evaporates through heat exchange with regenerative material 12, that is, by depriving the material of heat. Then, the refrigerant is returned to the suction side of compressor 1 through return line 17 and third solenoid valve 18.

In the rise-time operation, as described above, the refrigerant is heated by regenerative material 12 as it passes through heat exchanger 11 in thermal storage tank 3. Immediately after the start of operation of compressor 1, therefore, the refrigerant can reach a desired temperature. Thus, the ordinary heating operation can be started without delay.

If outdoor heat exchanger 5 is frosted during the heating operation, defrosting operation is performed. In doing this, first and third solenoid valves 6 and 18 are closed, and second and fourth solenoid valves 16 and 20 are opened. Meanwhile, only indoor fan 13 is driven, and outdoor fan 14 is stopped. The refrigerant discharged from compressor 1 is fed through heat exchanger 10 in thermal storage tank 3 and four-way valve 4 to indoor heat exchanger 5, to be condensed therein. Then, the condensed refrigerant flows through regeneration line 15 into heat exchanger 11 in tank 3, whereupon it is evaporated. The evaporated refrigerant is introduced into outdoor heat exchanger 8 through return line 17, defrosting line 19, and fourth solenoid valve 20. Thereafter, the refrigerant is returned to the suction side of compressor 1 via four-way valve 4 and check valve 9. As it is evaporated in heat exchanger 11, the refrigerant is heated, depriving regenerative material 12 of heat. Thus, the moment the defrosting operation is started, the refrigerant delivered to heat exchanger 8 is at a temperature and pressure high enough to defrost exchanger 8.

In the cooling operation, first to fourth solenoid valves 6, 16, 18 and 20 are operated in the same manner as in the heating operation, and four-way valve 4 is shifted to a cooling position in which its port indicated by a broken line in FIG. 1 takes the position indicated by the full line. Thus, in the cooling operation, the refrigerant from compressor 1 flows in the opposite direction to the cycle of the heating operation.

According to the air conditioner constructed in this manner, as described in detail herein, the maximum operating frequency of the compressor for the regenerating operation is set so as to be lower than that for the ordinary heating operation. Therefore, the pressure of the refrigerant can be prevented from increasing to an excessively high level such that compressor 1 is damaged or stopped. Thus, the regenerating operation can be accomplished efficiently. Since the compressor can be prevented from being stopped by breakdown or the like, moreover, the air conditioner is improved in reliability.

It is to be understood that the present invention is not limited to the embodiment described above, and that various changes and modifications may be effected therein by one skilled in the art without departing from the scope or spirit of the invention.

For example, the maximum operating frequency of the compressor for the regenerating operation is not limited to the value used in the above described embodiment, and may be changed as required. Moreover, thermal storage tank 3 may be located in any suitable position in the refrigerating cycle which permits storage of the heat of the refrigerant, that is, any position between the discharge side of compressor 1 and expansion valve 7. For example, tank 3 may be situated between four-way valve 4 and indoor heat exchanger 5. In the embodiment described above, furthermore, thermal storage tank 3 and indoor heat exchanger 5 are connected in series. Alternatively, however, a latent heat utilizing circuit may be arranged as follows. In the regenerating operation, the refrigerant discharged from the thermal storage tank is fed directly to the expansion valve, without being passed through the indoor heat exchanger. In utilizing latent heat, the refrigerant discharged from the compressor is fed directly into the indoor heat exchanger, without being passed through the storage tank, and the refrigerant condensed in the indoor heat exchanger is then fed into the storage tank.

What is claimed is:

1. An air conditioner having a refrigeration cycle comprising:
    a variable-capacity compressor having a predetermined maximum capacity;
    an indoor heat exchanger;
    an expansion device;
    an outdoor heat exchanger;
    a refrigerant circulation means connecting all of said previously recited components thereby forming a closed circuit through which a refrigerant flows;
    an indoor fan for introducing air into the indoor heat exchanger;
    an outdoor fan for delivering air to the outdoor heat exchanger; and
    regeneration means connected to the circulation means, at a point between the discharge side of the compressor and the expansion device, for storing residual heat of the refrigerant, whereby during an ordinary heating operation and during a regenerating operation heat from the compressor is stored into the regeneration means; and
    drive means for, during the regenerating operation, stopping the indoor fan and driving the compressor at a capacity that is less than the predetermined maximum capacity.

2. An air conditioner according to claim 1, wherein said drive means includes an inverter unit for adjusting the capacity of the compressor in accordance with an air-conditioning load of the refrigeration cycle.

3. An air conditioner according to claim 1, wherein said regeneration means comprises:
    a thermal storage tank;
    a regenerative material sealed in the thermal storage tank;
    a regenerative heat exchanger connected to the circulation means and located in the regenerative material;
    an endothermic heat exchanger located in the regenerative material; and wherein said air conditioner further comprises:
    a first line, through which the refrigerant condensed in the indoor heat exchanger is fed to the endothermic heat exchanger; and
    a second line, through which the refrigerant passed through the endothermic heat exchanger is fed to the suction side of the compressor.

4. An air conditioner according to claim 3, wherein said refrigeration cycle includes a third line having one end connected to the second line and the other end connected to the circulation means, at a point between the expansion device and the outdoor heat exchanger, for introducing the refrigerant passed through the endothermic heat exchanger to the outdoor heat exchanger.

5. An air conditioner according to claim 4, wherein said drive means includes valve means for controlling the flow of the refrigerant into the first, second, and third lines.

6. An air conditioner according to claim 5, wherein said valve means includes a first valve arranged in the circulation means, at a point between the first line and the expansion device, a second valve arranged in the first line, a third valve arranged in the second line, at a point between the section side of the compressor and the third line, and a fourth valve arranged in the third line.

7. An air conditioner according to claim 1, wherein said refrigeration cycle includes a four-way valve connected to the discharge and suction sides of the compressor.

8. An air conditioner according to claim 7, wherein said regeneration means is located between the discharge side of the compressor and the four-way valve.

9. An air conditioner having a refrigeration cycle comprising:

a variable-capacity compressor having a predetermined maximum capacity;
an indoor heat exchanger;
an expansion means;
an outdoor heat exchanger;
a refrigerant circulation means connecting all of said previously recited components, thereby forming a closed circuit through which a refrigerant flows;
an indoor fan for introducing air into the indoor heat exchanger;
an outdoor fan for delivering air to the outdoor heat exchanger; and
regeneration means connected to the circulation means at a point between the discharge side of the compressor and the indoor heat exchanger, for storing heat from the refrigerant discharged from the compressor during an orginary heating operation, rise-time operation, defrosting operation and regenerating operation, said regeneration means including:
a regeneration material;
a regenerative heat exchanger connected to the circulation means and located in the regenerative material;
an endothermic heat exchanger located in the regenerative material;
first bypass means for, in the rise-time operation, introducing the refrigerant passed through the indoor heat exchanger to the suction side of the compressor via the endothermic heat exchanger; and
second bypass means for, in the defrosting operation, introducing the refrigerant passes through the indoor heat exchanger into the outdoor heat exchanger via the endothermic heat exchanger; and
drive means, for in the regenerating operation, stopping the indoor fan and driving the compressor at a capacity that is less than the predetermined maximum capacity.

* * * * *